US009058215B2

(12) United States Patent
Colligan et al.

(10) Patent No.: US 9,058,215 B2
(45) Date of Patent: Jun. 16, 2015

(54) INTEGRATION OF A CALCULATION ENGINE WITH A SOFTWARE COMPONENT

(71) Applicants: Peter Colligan, Montreal (CA); Jean Sebastien Boileau, Montreal (CA); Cosmin Jimborean, Montreal (CA); Bernd Lehnert, Montreal (CA); Wolfgang Schuetz, Constance (DE)

(72) Inventors: Peter Colligan, Montreal (CA); Jean Sebastien Boileau, Montreal (CA); Cosmin Jimborean, Montreal (CA); Bernd Lehnert, Montreal (CA); Wolfgang Schuetz, Constance (DE)

(73) Assignee: SAP SE, Walldorf (DE)

( * ) Notice: Subject to any disclaimer, the term of this patent is extended or adjusted under 35 U.S.C. 154(b) by 467 days.

(21) Appl. No.: 13/655,469

(22) Filed: Oct. 19, 2012

(65) Prior Publication Data

US 2014/0115602 A1    Apr. 24, 2014

(51) Int. Cl.
*G06F 9/46* (2006.01)
*G06F 15/173* (2006.01)
*G06F 9/50* (2006.01)
*G06Q 30/06* (2012.01)

(52) U.S. Cl.
CPC .............. *G06F 9/5027* (2013.01); *G06Q 30/06* (2013.01); *G06F 2209/5017* (2013.01)

(58) Field of Classification Search
None
See application file for complete search history.

(56) References Cited

U.S. PATENT DOCUMENTS

| 7,181,417 | B1 * | 2/2007 | Langseth et al. ............. 705/26.5 |
| 7,188,085 | B2 * | 3/2007 | Pelletier .......................... 705/50 |
| 2004/0143571 | A1 * | 7/2004 | Bjornson et al. .................. 707/3 |
| 2008/0115143 | A1 * | 5/2008 | Shimizu et al. ................ 718/105 |
| 2010/0146510 | A1 * | 6/2010 | Teichmann et al. ........... 718/101 |
| 2011/0119604 | A1 * | 5/2011 | Lo et al. ......................... 715/762 |
| 2012/0030247 | A1 * | 2/2012 | Yambal et al. ................ 707/802 |
| 2013/0305087 | A1 * | 11/2013 | Catthoor et al. ................ 714/15 |

* cited by examiner

*Primary Examiner* — Adam Lee

(57) ABSTRACT

Various embodiments of systems and methods for integrating a calculation engine of an in-memory database with a software component are described herein. A control unit schedules and triggers jobs to be processed by an operational unit. The control unit and the operational unit are at an application level. The operational unit divides a job workload corresponding to a job trigger into work packages based on one or more parameters. The work packages are sent to a calculation engine in an in-memory database. At the in-memory database, operations are performed on the work packages and an output is generated. A log in the control unit is updated based on the output.

20 Claims, 9 Drawing Sheets

INTEGRATION OF A CALCULATION ENGINE WITH A SOFTWARE COMPONENT

BACKGROUND

Traditional database management systems rely on disk storage and have limited main memory. The main memory is accessible by a central processing unit (CPU) and input/output operations are performed between the disk and the main memory. These disk input/output operations are a performance bottleneck. An in-memory database overcomes this bottleneck. In an in-memory database, entire data relevant to a processing activity is stored in the main memory. Therefore, read operations can be executed without disk input/output operations, thereby enhancing performance. Any disk writing operations can happen asynchronously in the background without affecting CPU performance.

In-memory databases process large amounts of data in very short time. Typically, one or more software components are involved in a processing activity. Such software components can be stored external to the in-memory database. As an example, an external software component can be part of an existing data management system. Several situations require integration of an external software component and a process or a component of an in-memory database.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for integration of a calculation engine with a software component are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
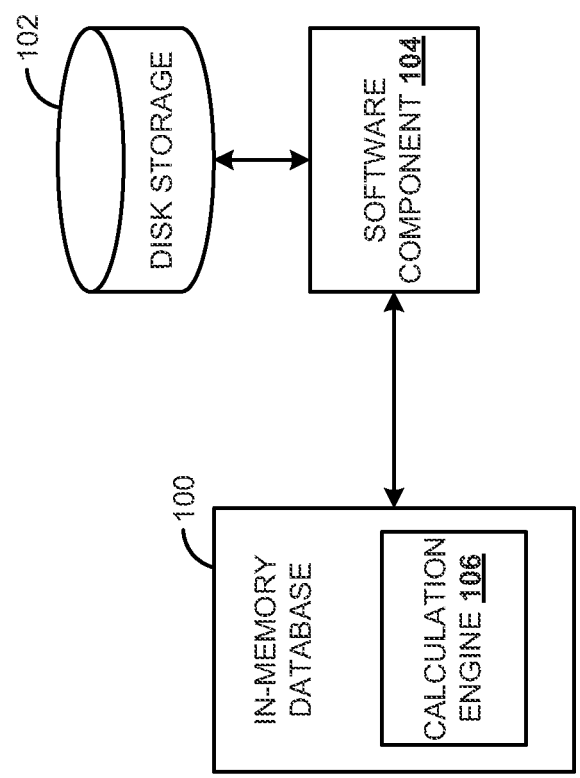
FIG. 1 is a block diagram illustrating an in-memory data base and a software application for integration with a calculation engine, according to one embodiment.

Referring to FIG. 1, an in-memory database 100 can be hosted on one or more machines. A host machine includes one or more central processing units, main memory, network, etc. A central processing unit (CPU) can include a plurality of cores, which enable faster processing. Increased number of cores in the CPUs and other similar technological advancements in main memory and processing hardware enable processing of large amounts of data in a short time frame. In an in-memory database 100, the capacity of the main memory enables storing of entire data required for a processing activity (also called as 'active' data) in the main memory itself. Compared to lower and slower memory hierarchy options (e.g., as in disk), this data in the main memory can be read during processing activity without disk input/output operations. Coupled with the multiple cores in CPU and use of data in the main memory, processing times are drastically improved.

Several software components deal with large amounts of data in the order of terabytes, petabytes, or even more. This data is typically stored in a disk-based storage system 102. Examples of such software components include enterprise resource planning (ERP) components and business intelligence (BI) application components. A retail software component 104, for example, can deal with point-of-sale and multi-channel sales data of many physical and online stores in a country. Similarly, inventory data at several warehouse locations can be managed by an inventory management component. An in-memory database can be used to store and analyze such large amounts of data. Data from the disk-storage, also known as 'cold' storage, is extracted into the main memory of the in-memory database. The in-memory database 100 includes one or more calculation engines 106 to analyze the extracted data. Proper integration of the software component 104 and the calculation engine 106 of the in-memory database 100 provides several benefits.

Figure 2:
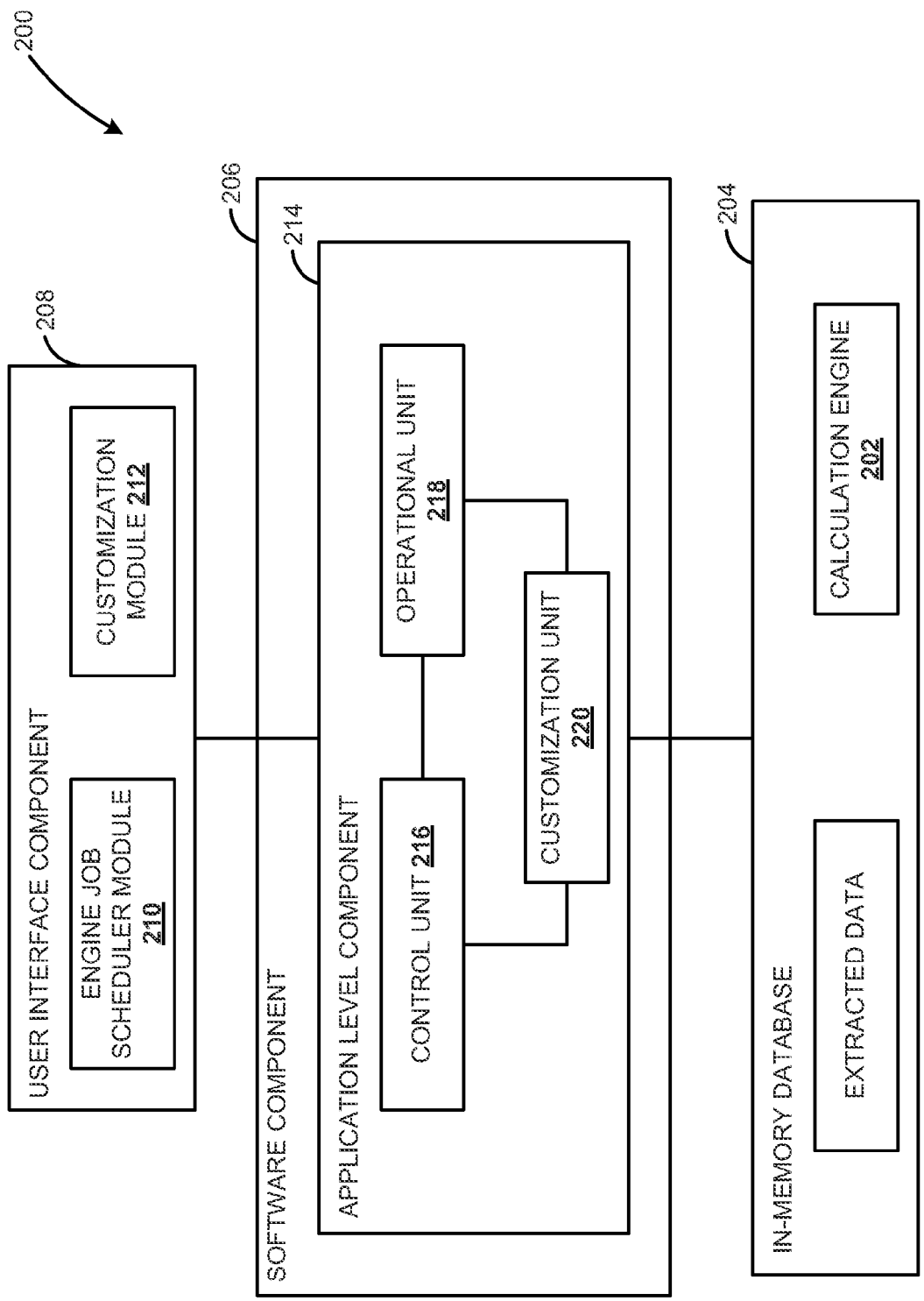
FIG. 2 is a block diagram of a framework illustrating integration of the calculation engine and the software application, according to one embodiment.

FIG. 2 illustrates an embodiment of a framework 200 for integration of a calculation engine 202 of an in-memory database 204 and a software component 206. In one embodiment, the software component 206 is an application server. The software component 206 can be a retail software component or any sub-component such as a point-of-sale data management component or e-commerce solution. The embodiments here are explained in relation to the point-of-sale data. However, it should be noted that the framework can be used with any cart software component that deals with larger amounts of data. In the context of a retail system, a point-of-sale data management (POSDM) component collects point-of-sale data such as cash register sales data from several stores. This data cart then be transmitted to a retail system or any back-end system for storage. Depending on the number and type of products and number of stores in which the products are sold, there can be large amounts of the point-of-sale data.

The point-of-sale data can be analyzed to obtain insights such as when a particular product would be out-of-shelf at a particular store. Accordingly, a potential out-of-shelf situation can be avoided. As another example, point-of-sale data can also be used to estimate which products have stronger sales, price sensitivities in different areas, etc. Point-of-sale data can be analyzed using appropriate calculations. First, the point-of-sale data stored in a retail system is extracted into the in-memory database 204. The in-memory database 204 includes a calculation engine 202 that performs operations on the point-of-sale data. In one embodiment, the calculation engine 202 runs on-shelf-availability calculations on the point-of-sale data to estimate out-of-shelf situations for products. An example of the on-shelf-availability calculation is explained in reference to FIG. 6.

The framework 200 includes a user interface component 208. The user interface component 208 provides one or more user interfaces that provide various options to configure execution and behavior of the framework. Various configuration parameters can be provided via the user interfaces. In one embodiment, the user interface component 208 includes an engine job scheduler module 210. An authorized user can select or provide a job scheduling option via the user interfaces related to the engine job scheduler module 210. For example, execution time of the calculation engine can be scheduled using these user interfaces. Also, user interfaces of the engine job scheduler module 210 can be used to monitor the performance of the calculation engine 202 in the in-memory database 204. For example, a monitoring user interface of the engine job scheduler module 210 can be used to view errors, warnings, or any similar system messages that are generated during the runtime.

In one embodiment, the user interface component 208 also includes a customization module 212 for configuring and customizing the calculation engine 202. The customization module 212 provides one or more user interfaces to support configuration and customizing of various parameters. The parameters can include application parameters and engine parameters. The application parameters are related to triggers of the calculation engine 202, in the context of on-shelf-availability calculations, an example of an application parameter is a probability threshold parameter for triggering the calculation engine. Engine parameters can be used to adjust the behavior of the calculation engine 202. For example, engine parameters can be used to influence the input and the output of the calculation engine 202. Other examples of customization parameters include parallel processing parameters such as maximum number of requests for a resource, outlier tolerances, level of granularity, confidence threshold levels, etc.

The framework includes an application level component 214. The application level component 214 is part of the software component 206 and includes a control unit 216 and an operational unit 218. The control unit 216 triggers jobs to be processed by the operational unit 218. The control unit 216 is responsible for commanding the right sequence of jobs, which depends on the current control state, the current operation state, and any external input such as log data and customization data. The operational unit 218 is responsible for input and output operations to the calculation engine 202. The operational unit 218 receives input from the control unit 216. In one embodiment, the application level component 214 also includes a customization unit 220. As mentioned previously, authorized users provide configuration parameters via the user interfaces. The customization unit 220 receives and stores these configuration parameters. The stored configuration parameters are used by the control unit 216 and operational unit 218 during the execution time of the calculation engine 202.

Figure 3:
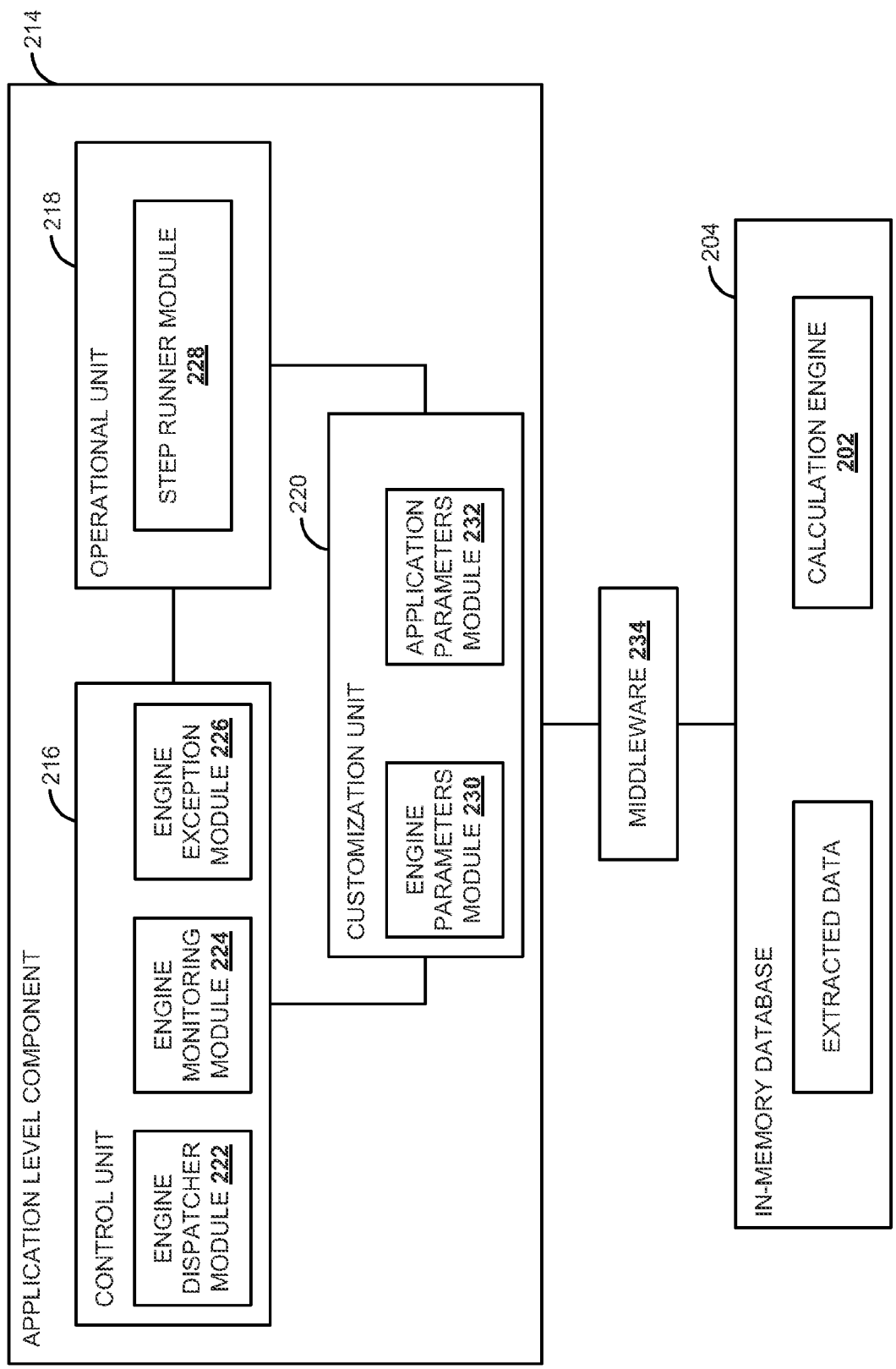
FIG. 3 is a block diagram illustrating modules of the application level component, according to one embodiment.

FIG. 3 illustrates modules of the application level component 214. In one embodiment, the control unit 216 of the application level component 214 includes an engine dispatcher module 222, an engine monitoring module 224, and an engine exception module 226. The operational unit 218 includes a step runner module 228. The engine dispatcher module 222 triggers the step runner programs of the step runner module 228. A step runner program executes the calculation engine 202 in the in-memory database 204. The engine monitoring module 224 provides statuses about the current jobs being processed by the calculation engine 202. The engine monitoring module 224 also provides past jobs status. In one embodiment, engine monitoring module 224 can have a dedicated user interface for displaying the statuses. The engine exception module 226 provides a list of exceptions that occurred during runtime. These exceptions can be displayed via a user interface. In one embodiment, the engine exception module 226 uses an application log to identify these exceptions. The step runner module 228 is a batch processing engine that receives data, sends the received data to the calculation engine 202, and persists the output of the calculation engine 202. In one embodiment, the output of the calculation engine 202 is stored in a global in-memory database table. This table can be queried by the user interface component.

In one embodiment, the customization unit 220 includes an engine parameters module 230 and a user settings module 232. The engine parameters module 230 receives engine parameters from the authorized users through the user interface component 208 (FIG. 2) and stores the configuration parameters. The user settings module 232 receives application parameters from the authorized users through the user interface component 208 (FIG. 2) and stores the application parameters. In one embodiment, a middleware platform 234 can be used to integrate the application level component 214 and the calculation engine 202. This middleware 234 can be an application server middleware that is capable of integrating applications and data sources.

Figure 4:
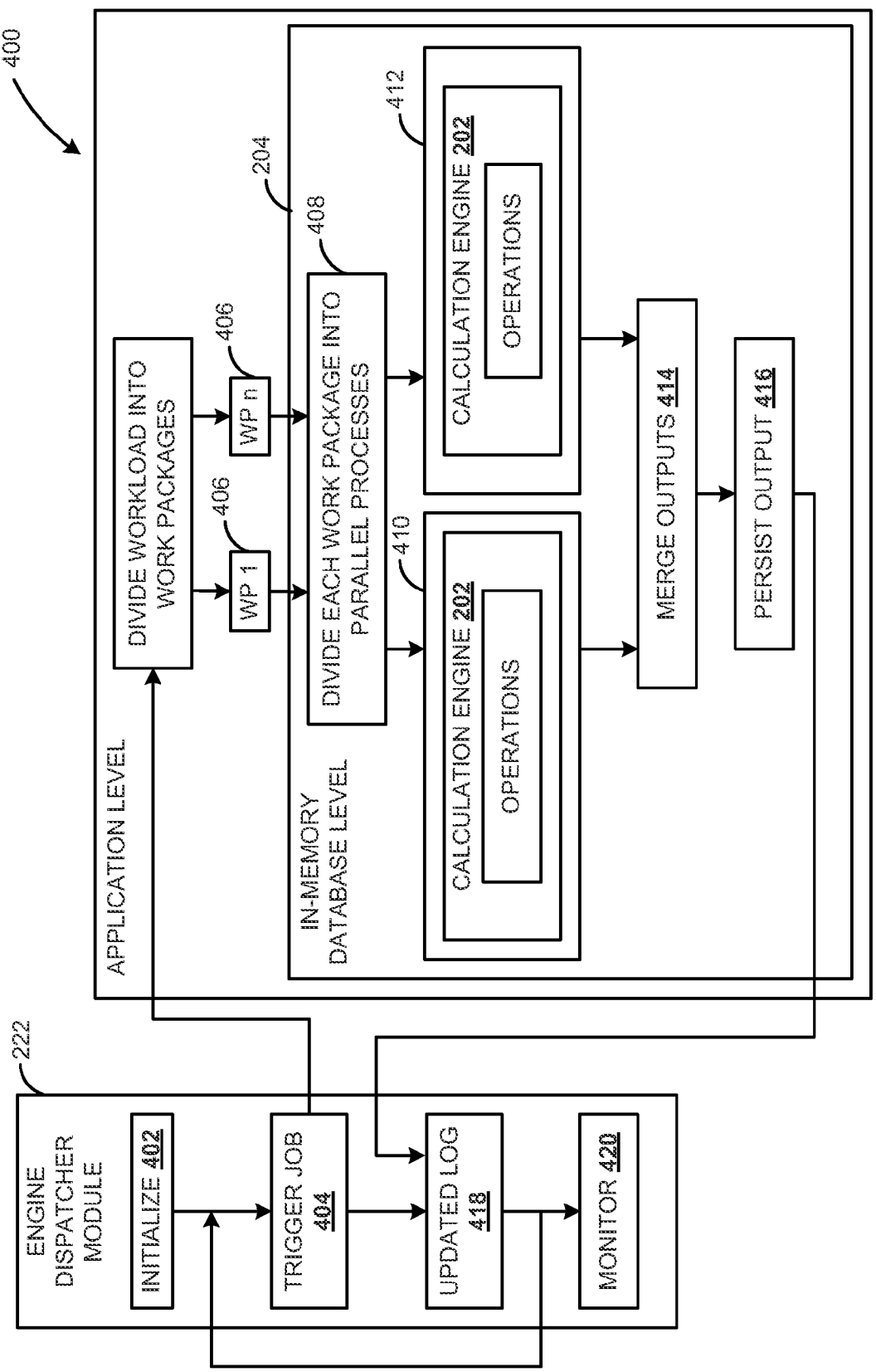
FIG. 4 is a block diagram illustrating parallelization of the workload, according to one embodiment.
Figure 5:
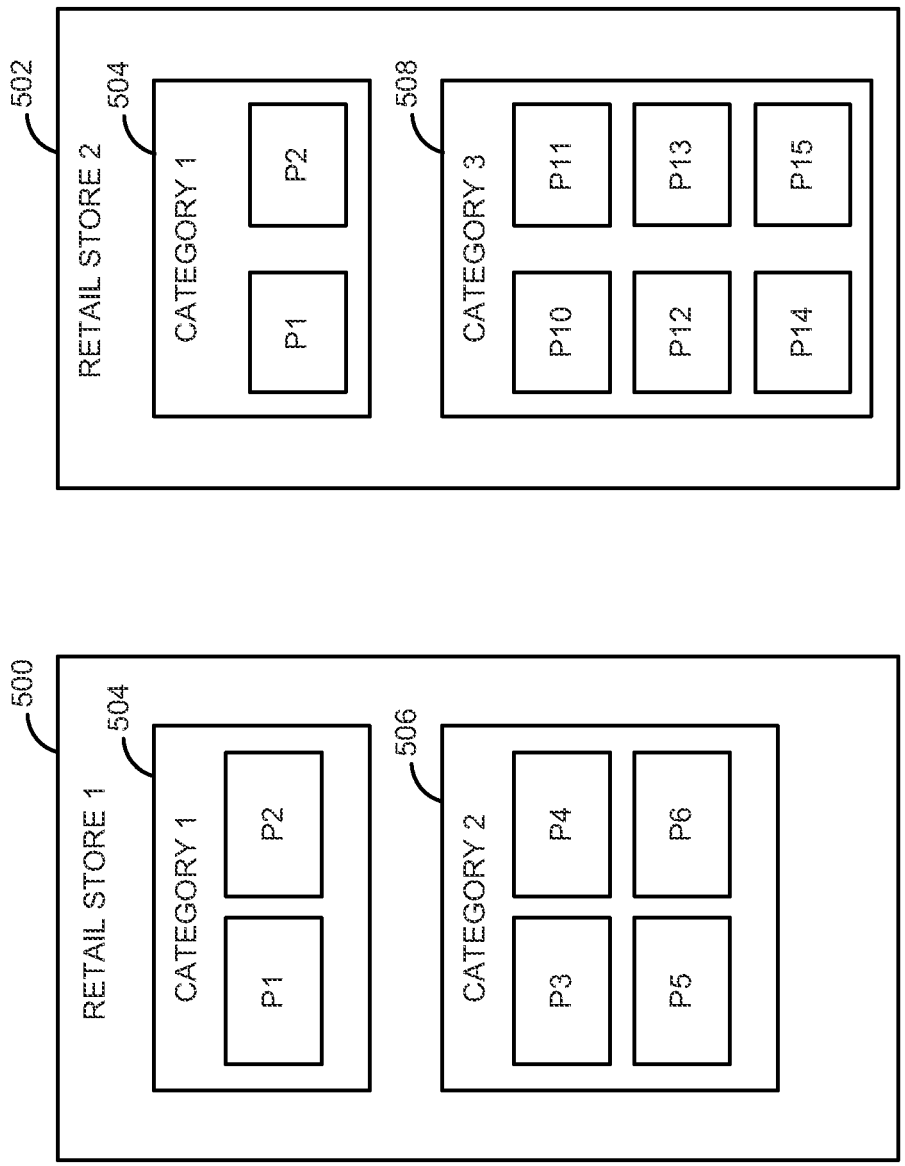
FIG. 5 is a block diagram illustrating products and product categories in relationship to stores, according to an example embodiment.

FIG. 4 illustrates an embodiment of parallelization 400 of a workload. The engine dispatcher module 222 of the control unit initializes job processing at 402 based on configuration parameters. A job is then triggered at 404. The operational unit takes this job trigger as an input. The job includes a workload to be processed the calculation engine. Depending on the configuration, there can be several job workloads, which can be triggered at various times. The workload is extracted and stored in the in-memory database. In the context of a point-of-sale data management application, the workload includes product data at several retails stores. Referring to FIG. 5, a company can offer its products through several retail stores. Each store can have multiple products of the same company. The products can be divided into several categories and sub-categories. These categories may be based on the product types, product variants, etc., depending on a company's product portfolio. A retail store may or may not offer all products of a company. For example, products P1 to P6 are offered for sale at a first retail store 500 and products P1, P2, and P10-P15 are offered for sale at a second retail store 502. Products P1 and P2 belong to a first product category 504, products P2-P6 belong to second product category 506, and products P10-P15 belong to a third product category 508. Although product categories are explained above in relation to retail stores, it should be noted that similar product categorization also exists in other retail channels such as e-commerce channels.

The point-of-sale data includes sale data such as the type of product sold and the location of sale. For example, if a product P1 is sold at store 1, data of this sale is collected by the point-of-sale data management component. This point-of-sale data implies that product P1 is sold at store 1. This point-of-sale of sale data from various stores is then sent to a backend ERP system or a retail system of the company. This data can be stored in a disk-based storage system associated with the retail system. In one embodiment, the point-of-sale of sale data is sent directly to an in-memory database. Entire point-of-sale data may not be needed for analysis. The control unit in combination with customization settings may specify what part of the point-of-sale data needs to be analyzed. For example, the point-of-sale data for the current month can be selected for analysis and forms the job workload.

Referring back to FIG. 4, at the application level component, the job workload is divided into a plurality of work packages at 406 based on one or more parameters. The operational unit 218 (FIG. 3) divides the workload into work packages based on the job trigger received from the engine dispatcher module 222. Depending on the field of application, these parameters can vary. In the context of point-of-sale data, the workload can be divided based on store location parameter. In another embodiment, the workload can be divided based any combinations of store locations and product categories. Therefore, a work package includes point-of-sale data of one or more stores. In one embodiment, the workload is divided into work packages using Advanced Business Application Programming (ABAP) based parallel processing. Parallel-processing can be implemented using a function module and appropriate variant of asynchonous remote function calls (RFC). As an example, the variant "CALL, FUNCTION STARTING NEW TASK DESTINATION IN GROUP" is used for parallel processing.

The work packages 406 are then sent to the in-memory database 204. In one embodiment, at the in-memory database level, each work package 406 is divided into a plurality of parallel processes at 408. This division can be based on one or more parameters, which can vary depending on field of application. For example, in the context of point-of-sale data, when a work package 406 includes point-of-sale data of a store, the work package 406 can be divided based on product category parameter. For example, a first parallel process 410 can contain point-of-sale data of a first group of products from the store and a second parallel process 412 can contain point-of-sale data of a second group of products from the store. As another example, if a work package 406 covers point-of-sale data of multiple stores, the work package 406 can be divided by refining the store location parameter and product category parameter. In one embodiment, the work packages 406 are divided such that each parallel process (i.e. divided work package) 410 and 412 includes point-of-sale data of equal number of products.

In one embodiment, Structure Query Language (SQL) partitioning technique is used to divide each work package 406 into parallel processes 410 and 412. SQL declarative logic can be used to divide the work packages into parallel processes 410 and 412. Declarative logic can be used for efficient execution of data-intensive computations. Declarative logic can be represented as data flows which can be executed in parallel. Operations in a dataflow graph have to be free of side effects. This means they should not change any global state either in the database or in the application. Procedure call approach can be used to parallelize SQL statements. For example, a procedure (or table function) can be called within the body of a procedure. The input of a procedure is split into multiple smaller data sets. The same procedure is called for these smaller data sets. Since data of each parallel process 410 and 412 is distinct, the calls can be parallelized. A separate call is used for each parallel process 410 and 412. Since data of each parallel process 410 and 412 is distinct, data used by each call is also distinct. Therefore, the calls can be parallelized.

Each parallel process 410 and 412 is then processed by the calculation engine 202. Operations are performed on each parallel process 410 and 412 and an output is generated for each parallel process 410 and 412. Following which, the outputs are merged at 414. In the context of point-of-sale data, the calculation engine performs on-shelf-availability calculations. On-shelf-availability calculations are performed on each parallel process by the calculation engine 202. The on-shelf-availability calculations use the sales transactions for a given location product and analyzes each sales interval to determine if the sales interval is unusually long indicating a potential out-of-shelf situation. A sales interval is the time between two subsequent sales transactions of a product at a particular store location. In one embodiment, the on-shelf-availability calculations output the probability of a product being out-of-shelf during a sales interval.

Figure 6:
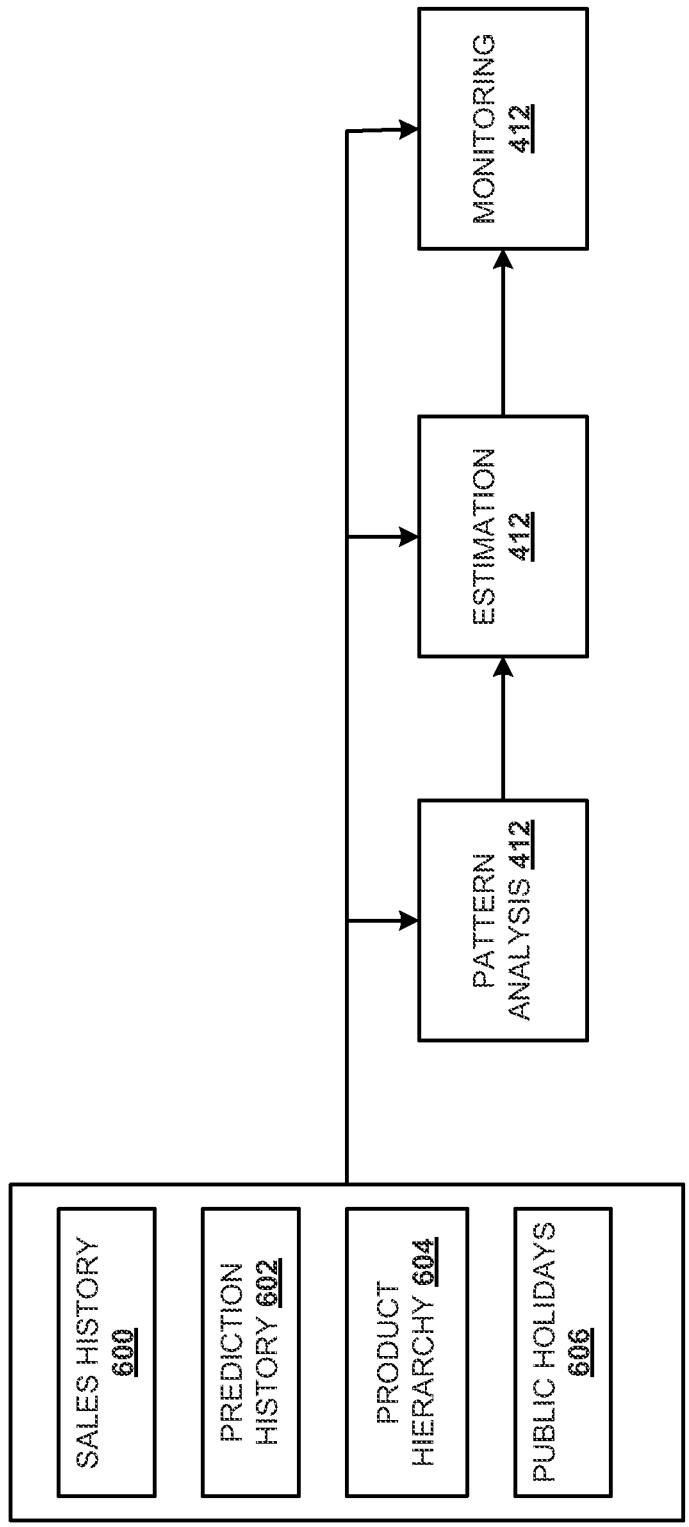
FIG. 6 is a block diagram of data flow for on-shelf availability calculations, according to one embodiment.

On-shelf-availability calculations are explained in reference to FIG. 6. Data such as sales history 600, prediction history 602, product hierarchy 604, and public holidays 606 are used for the on-shelf-availability calculations. The out-of-shelf detection includes three processing steps, namely, pattern analysis 608, estimation 610, and monitoring 612. The pattern analysis step 608 creates linear scales which are models for the regular intra-week and intra-day sales fluctuations of a single product or category. The pattern analysis calculations may be executed at regular intervals, e.g., once every week, and the results are used by the estimation step. The estimation step 610 estimates the model parameters for base estimation, trend, and the demand influencing factors. The estimation step 610 can be executed daily. The monitoring step 612 applies the estimated model to either the past sales transaction or the last sales transaction. When the estimated model is applied to the last sales transaction, products that are probably out-of-shelf currently are identified. When the estimated model is applied to the past sales transaction, previous out-of-shelf situations are searched. The monitoring step 612 can be performed daily or as often as necessary.

Referring back to FIG. 4, the results or output of the on-shelf-availability calculations on each parallel process are merged at 414. The merged results are then persisted at 416. In one embodiment, the results are persisted in the in-memory database 204. In addition to the output of the calculation engine, configuration data, master data, and intermediate data during on-shelf-availability calculations can also be persisted in the in-memory database 204. Each type of data can be stored in a respective table or a set of tables. A log in the control unit is updated at 418 after the merged results are persisted. Following which, the process flow in the control unit can move to job triggers depending on the scheduling configurations. The log can be used to monitor 420 job statuses and any engine exceptions.

In one embodiment, the work packages 406 are not divided into parallel processes at the in-memory database 204. In such case, the work packages are directly processed by the calculation engine 202. The calculation engine 202 generates an output for each work package. These outputs are merged and persisted and the log in the control unit is then updated. In one embodiment, the work packages 406 are divided into parallel processes only for some job workloads. The decision whether to divide the work packages 406 into parallel processes can be based on the size of the workload and available computing resources.

Figure 7:
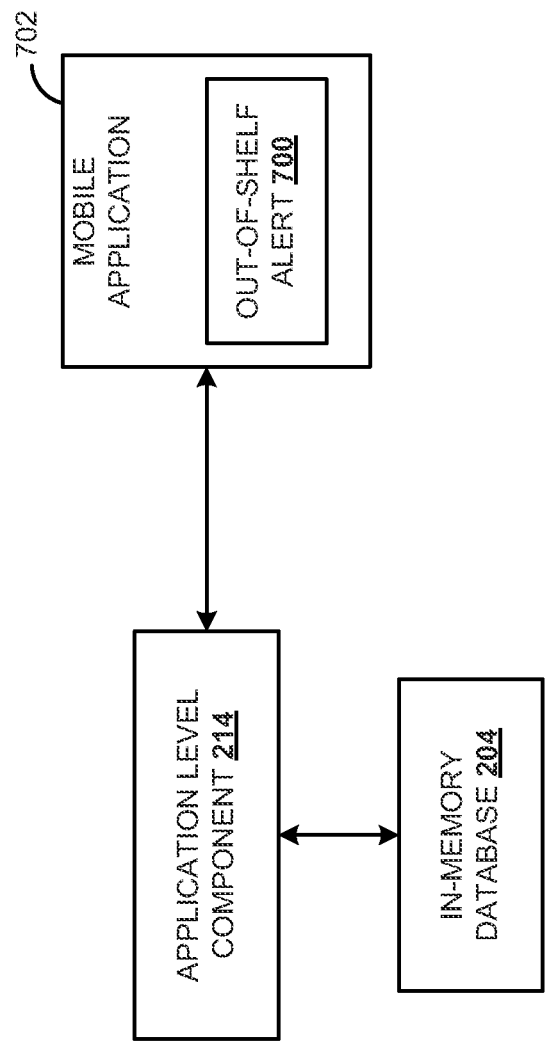
FIG. 7 is a block diagram illustrating out-of-shelf alert transmission, according to an example embodiment.

Referring to FIG. 7, if there is a probable out-of-shelf situation, then an alert 700 can be generated and sent to an end user. A mobile application 702 can be developed to provide out-of-shelf alerts. The end user can install this mobile application on a mobile computing device such as a phone or a tablet computer. An out-of-shelf alert 700 can be sent to the end user's mobile device via the mobile application 702.

Figure 8:
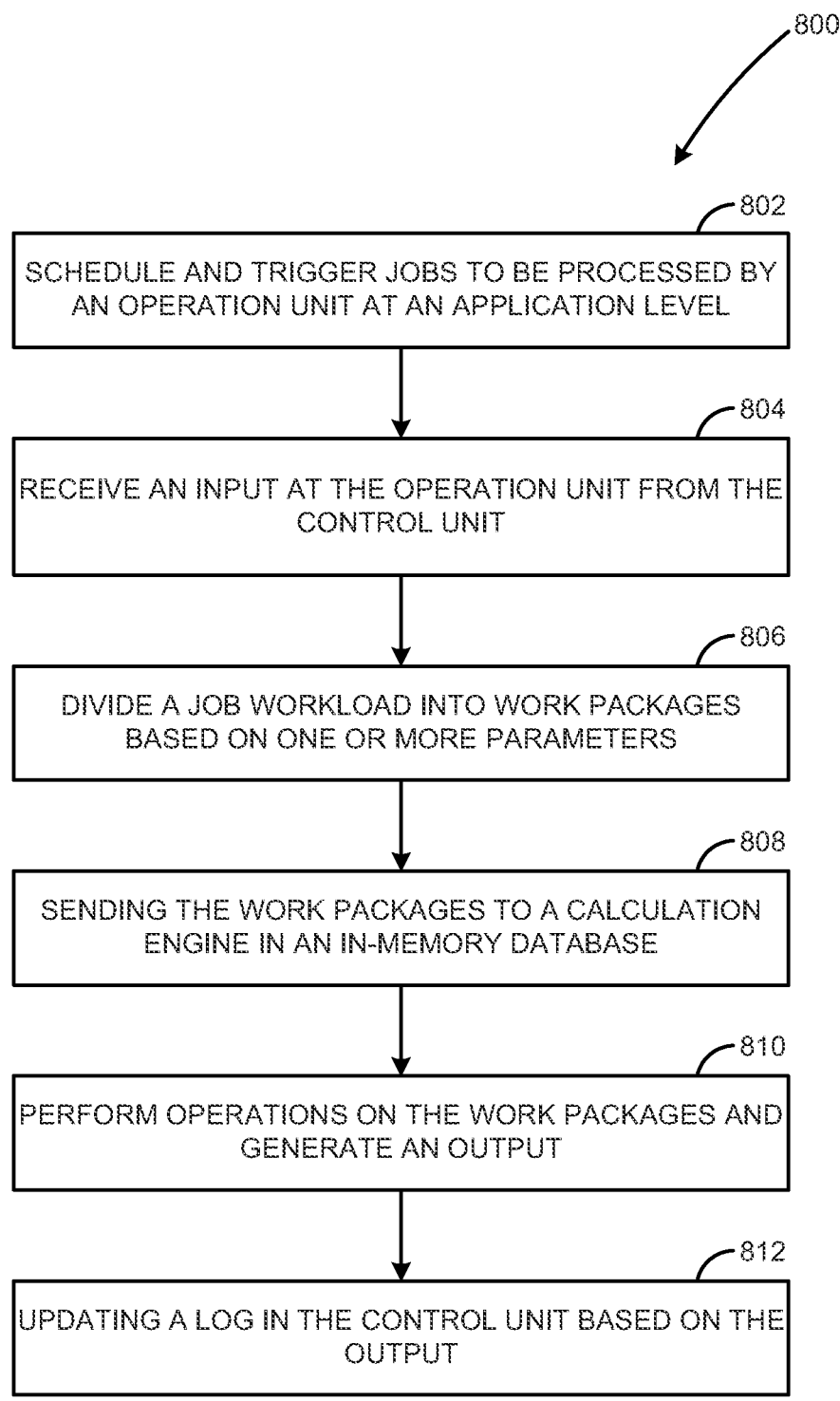
FIG. 8 is a block diagram of a method of integrating a software component with a calculation engine, according to one embodiment.

FIG. 8 illustrates an embodiment of a method 800 for processing jobs in the in-memory database. At 802, a control unit schedules and triggers jobs to be processed by an operational unit. The control unit and the operational unit are at an application level. A job trigger input is received at the operational unit at 804. At 806, the operational unit divides a job workload corresponding to the job trigger input into multiple work packages based on one or more parameters. The workload comprises data that is extracted and stored in the in-memory database. At 808, the work packages are sent to a calculation engine in an in-memory database. At 810, the calculation engine of the in-memory database performs on-shelf-availability calculations on the work packages and generates the output. At 812, a log in the control unit is updated based on the output of the calculation engine.

The above described framework and method integrates a software component with a calculation engine in an in-memory database. Such integration provides a means to monitor the performance of the calculation engine, schedule jobs for the calculation engine, and make any adjustments to the behavior of the calculation engine. Log data from output of the calculation engine cart be used for several applications. Also, parallelization of workload enables efficient use of computing resources.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
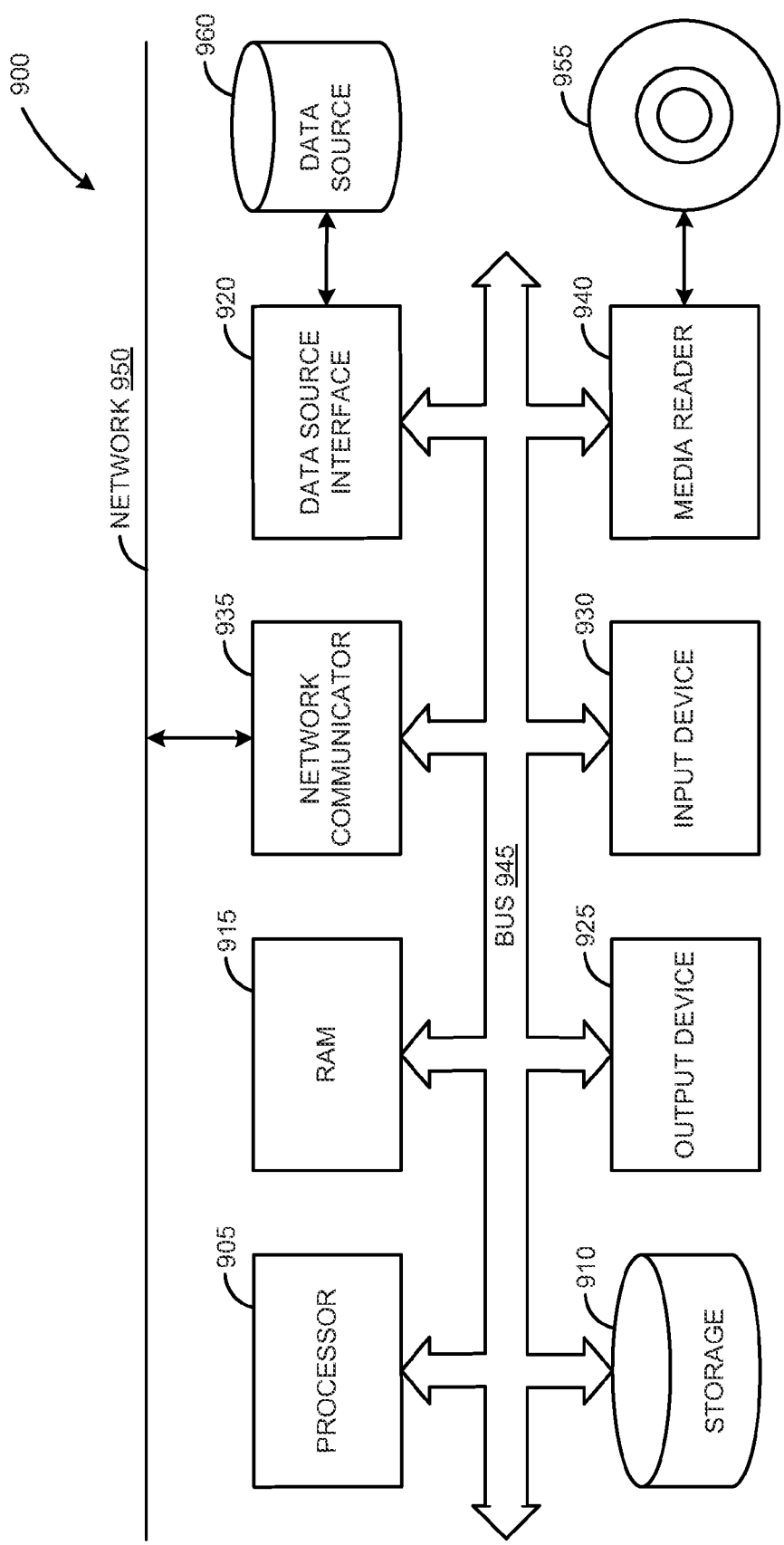
FIG. 9 is a block diagram of an exemplary computer system according to one embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. In case of an in-memory computing system, the RAM 915 can have more storage capacity and entire data required for processing can be extracted from the storage 910 and stored in the RAM 915. The stored instructions may be farther compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., MOIL data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system implementing software framework related to an in-memory database, the computer system comprising:
   a memory storing computer instructions; and
   a processor reading the instructions stored in the memory to generate the software framework comprising:
      a user interface component in an application layer to schedule jobs and configure a calculation engine of an in-memory database;
      an application level component comprising an operational unit and a control unit, wherein:
         the control unit performs operations comprising:
            triggering jobs to be processed by the operational unit; and
            updating a log based on output of the calculation engine;
         the operational unit performs operations comprising:
            receiving a job trigger input from the control unit;
            dividing a job workload into work packages based on one or more parameters, wherein the workload comprises data stored in the in-memory database; and
            sending the work packages to the calculation engine; and
         the calculation engine in the in-memory database to perform operations on the work packages and generating the output.

2. The computer system of claim 1, wherein performing the operations on the work packages, comprises:
   dividing the work packages into parallel processes in the in-memory database based on the one or more parameters; and
   performing the operations on the parallel processes.

3. The computer system of claim 2, wherein the one or more parameters comprise a store location and a product category.

4. The computer system of claim 3, wherein the data comprises point-of-sale data; and
   dividing the one or more of the work packages into the parallel processes comprises:
      creating the parallel processes such that each of the parallel processes includes point-of-sale data of one or more products.

5. The computer system of claim 4, wherein the operations comprise on-shelf availability calculations and the output of the calculation engine comprises an out-of-shelf alert for a product.

6. The computer system of claim 1, wherein the application level component further comprises a customization unit that receives and persists configuration parameters of the calculation engine.

7. The computer system of claim 1, wherein the operational unit performs further operations comprising:
   persisting the output of the calculation engine.

8. An article of manufacture including a non-transitory computer readable storage medium to tangibly store instructions, which when executed by a computer, cause the computer to:
   by a control unit at an application level, trigger jobs to be processed by an operational unit at the application level;
   receive a job trigger input at the operational unit from the control unit;
   by the operational unit, divide a job workload into work packages based on one or more parameters, wherein the workload comprises data stored in an in-memory database; and
   send the work packages to a calculation engine in the in-memory database;
   at the in-memory database, perform operations on the work packages and generate an output; and
   update a log in the control unit based on the output of the calculation engine.

9. The article of manufacture of claim 8, wherein the instructions to perform operations on the work packages, further comprises instructions, which when executed by a computer, cause the computer to:
   divide the work packages into parallel processes in the in-memory database based on the one or more parameters; and
   perform the operations on the parallel processes.

10. The article of manufacture of claim 9, wherein the one or more parameters comprise a store location and a product category.

11. The article of manufacture of claim 10, wherein the data comprises point-of-sale data; and
   the instructions to divide the one or more of the work packages into the parallel processes, further comprises instructions, which when executed by a computer, cause the computer to:
      create the parallel processes such that each of the parallel processes includes point-of-sale data of one or more products.

12. The article of manufacture of claim 11, wherein the operations comprise on-shelf availability calculations and the output of the calculation engine comprises an out-of-shelf alert for a product.

13. The article of manufacture of claim 8, further comprises instructions, which when executed by a computer, cause the computer to:
at the application level component, receive and persist configuration parameters of the calculation engine.

14. The article of manufacture of claim 8, further comprises instructions, which when executed by a computer, cause the computer to:
persist the output of the calculation engine.

15. A computerized method for processing jobs in an in-memory database, method comprising:
by a control unit at an application level, triggering jobs to be processed by an operational unit at the application level;
receiving a job trigger input at the operational unit from the control unit;
by the operational unit, dividing a job workload into work packages based on one or more parameters, wherein the workload comprises data stored in an in-memory database; and
sending the work packages to a calculation engine in the in-memory database;
at the in-memory database, performing operations on the work packages and generate an output; and
updating a log in the control unit based on the output of the calculation engine.

16. The method of claim 15, wherein performing the operations on the work packages, comprises:
dividing the work packages into parallel processes in the in-memory database based on the one or more parameters; and
performing the operations on the parallel processes.

17. The method of claim 16, wherein the one or more parameters comprise a store location and a product category.

18. The method of claim 17, wherein the data comprises point-of-sale data; and
dividing the one or more of the work packages into the parallel processes, further comprises:
creating the parallel processes such that each of the parallel processes includes point-of-sale data of one or more products.

19. The method of claim 18, wherein the operations comprise on-shelf availability calculations and the output of the calculation engine comprises an out-of-shelf alert for a product.

20. The method of claim 15, further comprising:
at the application level component, receiving and persisting configuration parameters of the calculation engine; and
persisting the output of the calculation engine.

* * * * *